United States Patent [19]
Jackson

[11] 4,311,180
[45] Jan. 19, 1982

[54] PNEUMATIC TIRE CAPABLE OF BEING DRIVEN DEFLATED

[75] Inventor: William L. Jackson, Sutton Coldfield, England

[73] Assignee: Dunlop Limited, London, England

[21] Appl. No.: 166,193

[22] Filed: Jul. 7, 1980

Related U.S. Application Data

[60] Division of Ser. No. 944,899, Sep. 22, 1978, abandoned, which is a continuation of Ser. No. 759,015, Jan. 13, 1977, abandoned.

[30] Foreign Application Priority Data

Jan. 27, 1976 [GB] United Kingdom ............... 03170/76

[51] Int. Cl.³ .................. B60C 5/02; B60C 13/00; B60C 17/04
[52] U.S. Cl. .................. 152/330 RF; 152/353 R; 152/354 R; 152/361 R
[58] Field of Search ........ 152/330 R, 330 RF, 330 L, 152/352 R, 352 A, 353, 361, 354, 362

[56] References Cited

U.S. PATENT DOCUMENTS

| Re. 28,587 | 10/1975 | Powell et al. | 152/330 RF |
| 3,734,157 | 5/1973 | Roque | 152/354 |
| 3,861,438 | 1/1975 | Bertelli et al. | 152/353 C |
| 3,910,334 | 10/1975 | Gardner | 152/330 L |
| 3,980,119 | 9/1976 | Nakasaki | 152/354 |
| 3,994,329 | 11/1976 | Masson et al. | 152/353 R |
| 4,057,092 | 11/1977 | Tracy | 152/379.1 |
| 4,241,775 | 12/1980 | Jackson | 152/330 RF |

FOREIGN PATENT DOCUMENTS

| 2425068 | 4/1975 | Fed. Rep. of Germany . |
| 6961 | of 1897 | United Kingdom . |
| 29140 | of 1897 | United Kingdom . |
| 28233 | 12/1904 | United Kingdom . |
| 339403 | 12/1930 | United Kingdom . |
| 1359461 | 7/1974 | United Kingdom . |
| 1359463 | 7/1974 | United Kingdom . |
| 1359468 | 7/1974 | United Kingdom . |

Primary Examiner—John E. Kittle
Attorney, Agent, or Firm—Stevens, Davis, Miller & Mosher

[57] ABSTRACT

A pneumatic tire having a tread and a pair of sidewalls each terminating in a tire bead in which, in use, of the tire on the wheel rim for which it is designed, the sidewalls are so shaped and reinforced that they are placed in tension when the tire is inflated to its normal working pressure and are placed in compression when the inflation pressure falls below a predetermined value.

6 Claims, 9 Drawing Figures

PNEUMATIC TIRE CAPABLE OF BEING DRIVEN DEFLATED

This is a Division of application Ser. No. 944,899 filed Sept. 22, 1978 which in turn is a Continuation of Ser. No. 759,015 filed Jan. 13, 1977, now both abandoned.

The present invention relates to a pneumatic tire capable of being driven deflated.

A pneumatic tire capable of being driven deflated is required to function quite differently when driven deflated and inflated. It is well known that the load carried by a pneumatic tire varies approximately according to the equation $L=(A+BP)d$ where:

$L$ = Load
$A$ = Structural Stiffness
$BP$ = Pneumatic Stiffness
$P$ = Pressure
$B$ = Pneumatic Constant
$d$ = deflection at the Load L The other control properties of the tire, for example cornering force, and lateral stiffness, also behave in a similar way, being generated partly by the elastic stiffness of the materials used in the tire and partly by the pneumatic pressure of the tire.

It is generally desirable to increase the pneumatic contribution to a stiffness such that the structural stiffness A is small relative to the pneumatic stiffness BP. The reason for this is that the cyclic strains developed during normal running generate heat. The pneumatic stiffness can be increased without any increase in heat generation but the structural stiffness, being due to the elasticity of the materials, cannot be increased without a consequent increase in heat generation unless materials of lower hysteresis are employed in the tire structure.

For a conventional pneumatic tire:

$L=(A_1+B_1P)d_1$ when inflated and $L=(A_1+O)d_2$ when deflated.

Because $B_1Pd_1$ carries the major share of the load, $d_2$ is very much larger than $d_1$. Furthermore since heat generation increases as the square of "d" a loss of pressure is followed by a large increase in temperature. Previous attempts to avoid the increase in temperature consequent on loss of inflation pressure in tires designed to be driven deflated have involved increasing the structural stiffness of the tire to reduce the deflated deflection to a lower level $d_3$ whereupon $L=A_2d_3$ when deflated. Provided the deflated tire is not driven at high speeds or for excessively long periods the tire can be driven deflated.

However, modifying the structural stiffness of the tire to reduce the deflated deflection $d_2$ means that under normal running conditions the structural stiffness will be increased and the pneumatic stiffness reduced if the same total tire stiffness is to be maintained. This alteration of the relative proportions of structural stiffness and pneumatic stiffness results in an increase in the heat generation and rolling resistance of the tire during normal running. Thus previous proposals for designing pneumatic tires capable of being driven deflated have relied on increasing the structural stiffness of the tire and this has resulted in a consequent increase in heat generation and total stiffness during normal inflated use.

During normal running the deflection of the tire is a very small proportion, approximately one fifth, of the maximum possible deflection. A high value of maximum deflection is desirable when the tire passes over large obstacles at speed and serves to protect the rim and vehicle from shock loads. However it is only required occasionally. Heat generation at this maximum deflection is high but since it only occurs for a small fraction of the tires life it does not constitute any threat to the performance of the tire. Therefore it is possible to accomodate the occasional large deflection using a mechanism which has a structural stiffness only. The pneumatic mechanism needed in normal running could then have a very much reduced maximum deflection. The collapse of the tire when deflated would then be about one fifth of its present value and it could therefore be a total collapse and result in an effective change from a pneumatic tire to a structural tire. Because the structural mechanism is not used in normal running it could have a very high stiffness.

Accordingly the present invention provides a pneumatic tire having a tread and a pair of sidewalls each terminating in a tire bead in which, in use of the tire on the wheel rim for which it is designed, the sidewalls are so shaped and reinforced that they are placed in tension when the tire is inflated to its normal working pressure and are placed in compression when the inflation pressure falls below a predetermined value.

Preferably the tread is braced by a breaker assembly and each sidewall consists of a rigid radially inner portion adjacent the tire bead and a flexible radially outer portion such that when the tire is mounted on the wheel rim for which it is designed and driven deflated the radially inner portions of the sidewalls act as a rigid support for the tread, preventing the tread from collapsing onto the wheel rim under load.

The rigid radially inner portions of the sidewalls may extend radially outwardly to a height greater than half the cross-sectional height of the tire, preferably greater than four fifths the cross-sectional height of the tire.

The tire may comprise a ply of cords extending radially from one tire bead to the other.

Preferably a coating of a lubricating material is provided on the portions of the interior surface of the tire which come into contact when the tire is driven deflated to facilitate relative movement between contacting portions of the interior surface of the tire.

The present invention may be used in conjunction with the inventions of the assignee's U.K. Pat. Nos. 1,359,463, 1,359,468 and 1,359,461.

Specific examples of pneumatic tires according to the invention will now be described, by way of example, with reference to the accompanying drawings in which.

Figure 1:
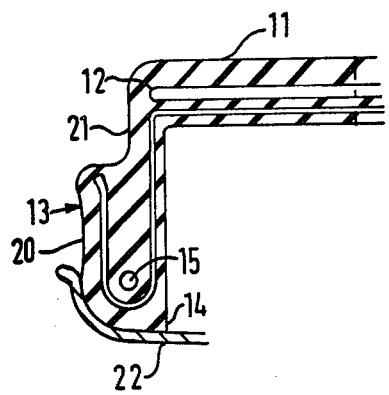
FIG. 1 shows diagrammatically in section a tire in the as-moulded configuration.

The tire illustrated in FIGS. 1 to 4 comprises a tread 11 braced by a breaker assembly 12 with sidewalls 13 each terminating in a bead 14 reinforced with a bead wire 15. The tire is reinforced by a single ply 17 of radial cords extending from one tire bead to the other and turned around each bead wire 15 to extend radially outwardly into the sidewalls 13.

Each sidewall 13 consists of a rigid portion 20 adjacent the tire bead 14 extending radially outwardly to a height of about four fifths of the overall cross-sectional height of the tire. The remainder of each sidewall 13 adjacent the tread 11 consists of a flexible portion 21.

It is intended that when the tire is mounted on a wheel rim the axial distance between the tire beads in the as-moulded configuration should be reduced. This will require considerable force because the action will pre-tension the sidewalls 13 and to facilitate this the tire is mounted on a divided wheel rim 22 consisting of two separate parts.

Figure 2:
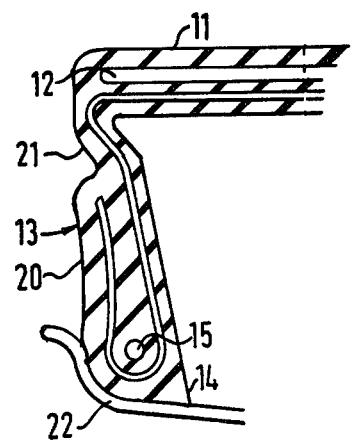
FIG. 2 shows diagrammatically the tire of FIG. 1 mounted on a wheel rim and uninflated.
Figure 3:
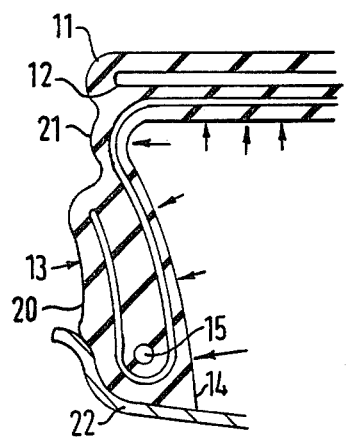
FIG. 3 shows the tire and wheel rim of FIG. 2 when inflated.
Figure 4:
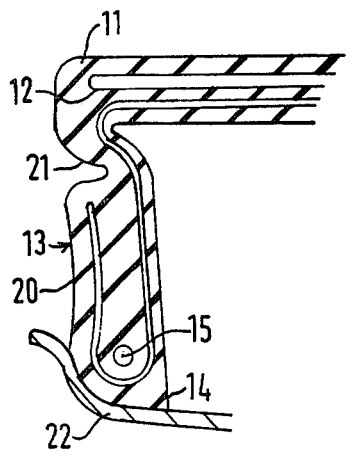
FIG. 4 shows the tire and wheel rim of FIG. 2 when deflated and under load.

When deflated and deflected under load the flexible sidewall portion 21 which constitutes the pneumatic part of the tire collapses completely and the rigid portion 20 of each sidewall 13 returns to the position it assumes when mounted uninflated as shown in FIG. 2.

Figure 5:
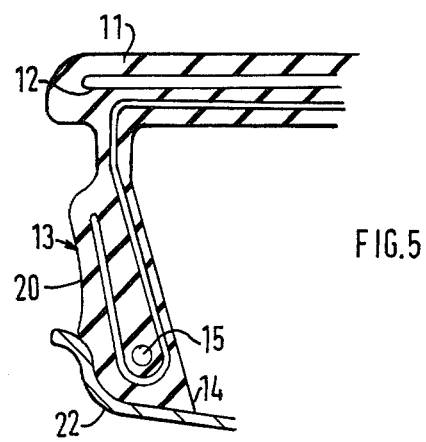
FIG. 5 shows diagrammatically in section a second pneumatic tire mounted on a wheel rim and inflated.
Figure 6:
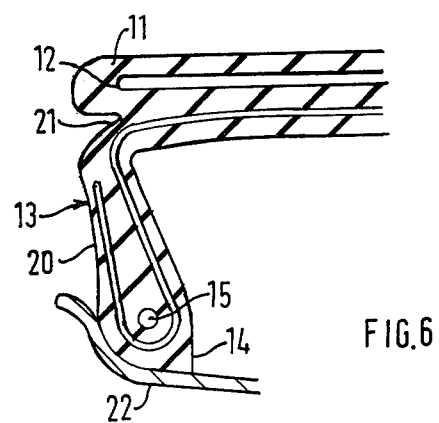
FIG. 6 shows the tire and wheel rim of FIG. 5 when deflated and under load.

The tire illustrated in FIGS. 5 and 6, in which parts identical to those shown in FIGS. 1 to 4 are given the same reference numerals, is designed so that the sidewalls 13 remain inclined after deflation leading to better lateral stability. In this tire the sidewalls are not pre-tensioned when mounted on the wheel rim since, when deflated, the rigid portions 20 of the sidewalls 13 collapse outwardly taking up the slack in the flexible portions 21 of the sidewalls 13.

Figure 7:
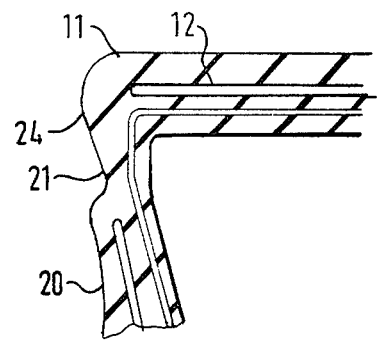
FIG. 7 shows diagrammatically in section a part of a third pneumatic tire.
Figure 8:
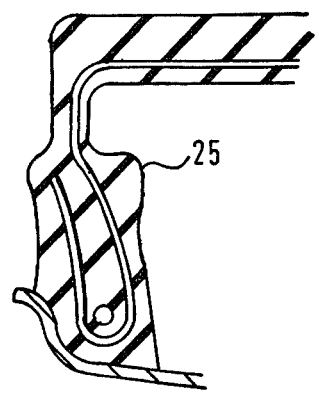
FIG. 8 shows diagrammatically in section a fourth pneumatic tire mounted on a wheel rim and inflated.
Figure 9:
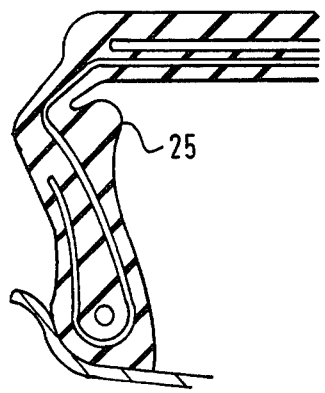
FIG. 9 shows the pneumatic tire and wheel rim of FIG. 8 when deflated and under load.

It will be appreciated that the projecting shelf at the edge of the breaker constitutes a design disadvantage. This can be eliminated as illustrated at 24 in FIG. 7 by extending the tread over the sidewall. Alternatively the slack in the flexible portion of the sidewall can be taken up by providing a projection 25 on the inner part of the sidewall as illustrated in FIGS. 8 and 9.

Having now described my invention what I claim is:

1. A pneumatic tire and wheel assembly, the tire comprising a braced tread, two beads, two sidewalls each extending between the tread and one of the beads wherein, when the assembly is un-inflated and not mounted on a vehicle, the sidewalls are under tension radially of the tire.

2. A pneumatic tire and wheel assembly according to claim 1, wherein when the assembly is mounted on a vehicle and is under load, and the inflation pressure is below a predetermined level, part of each tire sidewall at the lowest region of the tire is in compression radially of the tire and acts as a support to prevent the tread from collapsing on to the wheel rim.

3. A pneumatic tire for use in the assembly of claim 2 in which the tread is braced by a breaker assembly, each sidewall consists of an inflexible radially inner portion adjacent the tire bead and flexible radially outer portion and, when the tire is mounted on the wheel rim for which it is designed and driven deflated under load, the inflexible radially inner portions of the sidewalls act as a rigid support for the tread to prevent the tread from collapsing on to the wheel rim.

4. A pneumatic tire as claimed in claim 3 which is so shaped that when mounted on a wheel and deflated under load the inside edge and the outside edge of a sidewall are generally parallel to each other and no portion of the tire extends axially outwards farther from said outside edge or the radial projection thereof.

5. A pneumatic tire as claimed in claim 3 in which when deflated under load the outside edge of the sidewall is a generally straight line approximately perpendicular to the ground contacting portion of the tread.

6. pneumatic tire as claimed in claim 3 in which the flexible radially outer portion of the sidewall is thinner than the remainder of the sidewall and has an annular recess in its outer surface.

* * * * *